United States Patent
Lax et al.

(10) Patent No.: US 11,188,807 B2
(45) Date of Patent: Nov. 30, 2021

(54) DATA PROCESSING APPARATUS

(71) Applicant: Septillion Technologies Limited, St. Andrews (GB)

(72) Inventors: Craig Ellis Lax, Dunfermline (GB); Sandford Ellis Lax, Dunfermline (GB)

(73) Assignee: Septillion Technologies Limited

( * ) Notice: Subject to any disclaimer, the term of this patent is extended or adjusted under 35 U.S.C. 154(b) by 0 days.

(21) Appl. No.: 16/978,081

(22) PCT Filed: Mar. 4, 2019

(86) PCT No.: PCT/GB2019/050593
§ 371 (c)(1),
(2) Date: Sep. 3, 2020

(87) PCT Pub. No.: WO2019/171033
PCT Pub. Date: Sep. 12, 2019

(65) Prior Publication Data
US 2021/0027132 A1    Jan. 28, 2021

(30) Foreign Application Priority Data
Mar. 5, 2018 (GB) ...................................... 1803528

(51) Int. Cl.
*G06F 17/00* (2019.01)
*G06K 19/06* (2006.01)
(Continued)

(52) U.S. Cl.
CPC .......... *G06K 19/086* (2013.01); *B42D 25/20* (2014.10); *G06K 19/06093* (2013.01); *G07D 7/12* (2013.01)

(58) Field of Classification Search
USPC ............................ 235/491, 494, 462.01, 375
See application file for complete search history.

(56) References Cited

U.S. PATENT DOCUMENTS

| | | | |
|---|---|---|---|
| 10,664,730 B2 * | 5/2020 | Lau | D06H 1/043 |
| 2005/0100204 A1 * | 5/2005 | Afzal | G06K 9/228 |
| | | | 382/135 |

(Continued)

FOREIGN PATENT DOCUMENTS

| | | |
|---|---|---|
| DE | 202008014997 U1 | 2/2009 |
| WO | 2005/080088 A1 | 9/2005 |

OTHER PUBLICATIONS

GB Intellectual Property Office, Search Report issued for GB1803528.7, 3 pgs., dated Aug. 31, 2018.

(Continued)

*Primary Examiner* — Tuyen K Vo
(74) *Attorney, Agent, or Firm* — Schiff Hardin LLP

(57) ABSTRACT

Data processing apparatus is provided comprising one or more processors. The data processing apparatus may be configured to perform a method of determining authentication data for authenticating an object comprising one or more identification elements which are detectable when electromagnetic radiation is incident thereon. The method may comprise obtaining image data relating to one or more of the identification element(s) of the object, processing the image data to determine outline data relating to outline(s) of one or more of the identification element(s) to which the image data relates and determining the authentication data from the outline data.

25 Claims, 6 Drawing Sheets

(51) Int. Cl.
   *G06K 19/08*   (2006.01)
   *B42D 25/20*   (2014.01)
   *G07D 7/12*    (2016.01)

(56) References Cited

U.S. PATENT DOCUMENTS

| | | | | |
|---|---|---|---|---|
| 2005/0210255 | A1* | 9/2005 | Kirovski | G06T 1/0021 713/176 |
| 2008/0080009 | A1* | 4/2008 | Masui | G06T 1/0028 358/3.28 |
| 2009/0074231 | A1* | 3/2009 | Rancien | D21H 21/40 382/100 |
| 2009/0283583 | A1* | 11/2009 | Cowburn | G06Q 10/087 235/375 |
| 2010/0040265 | A1* | 2/2010 | Iizuka | G06K 9/4633 382/128 |
| 2011/0049865 | A1* | 3/2011 | Bray | B41M 3/14 283/114 |
| 2011/0123132 | A1 | 5/2011 | Schneck et al. | |
| 2012/0212324 | A1 | 8/2012 | Pollard et al. | |
| 2012/0273564 | A1* | 11/2012 | Mercolino | G07D 7/20 235/375 |
| 2013/0193211 | A1 | 8/2013 | Baqai et al. | |
| 2015/0121512 | A1* | 4/2015 | Lau | G07D 7/205 726/19 |
| 2016/0307035 | A1 | 10/2016 | Schilling et al. | |
| 2017/0228628 | A1* | 8/2017 | Lau | D06H 1/00 |

OTHER PUBLICATIONS

GB Intellectual Property Office, Search Report issued for GB190287738, 3 pgs., dated Aug. 5, 2019.
European Patent Office, PCT Search Report issued for PCT/GB2019/050593, 16 pgs., dated May 23, 2019.

* cited by examiner

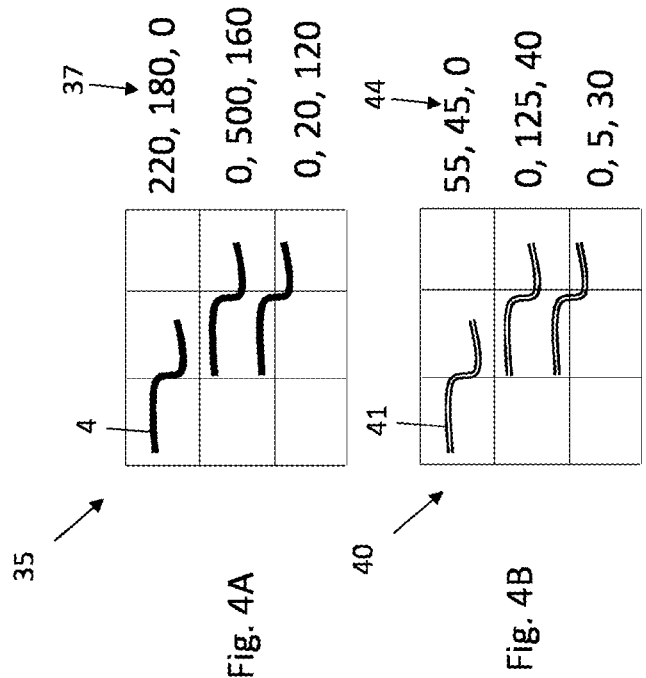
Fig. 4A
Fig. 4B
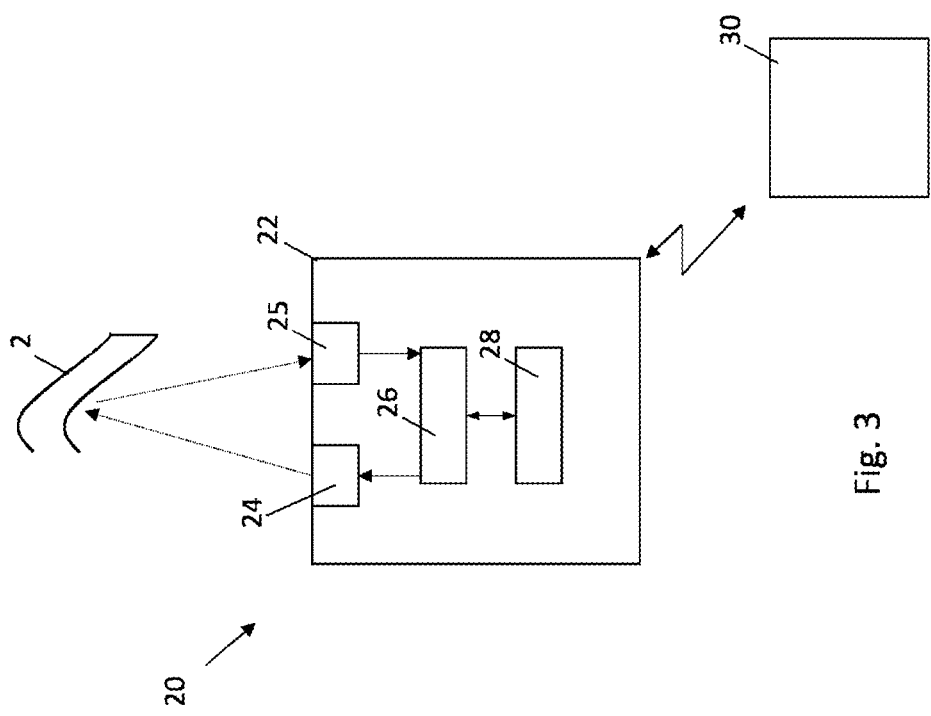
Fig. 3

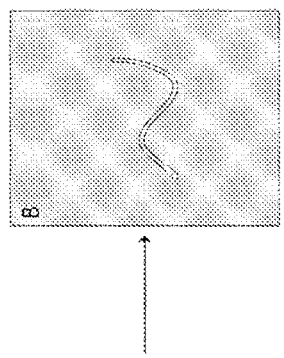
Fig. 7A
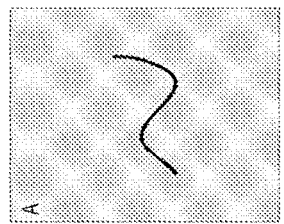
Fig. 7B
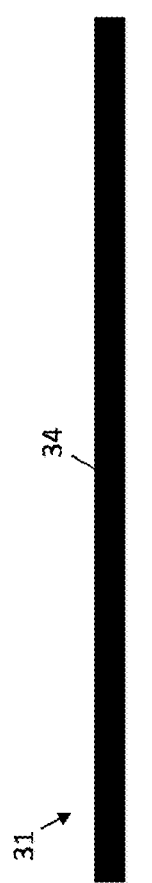
Fig. 5A
Fig. 5B
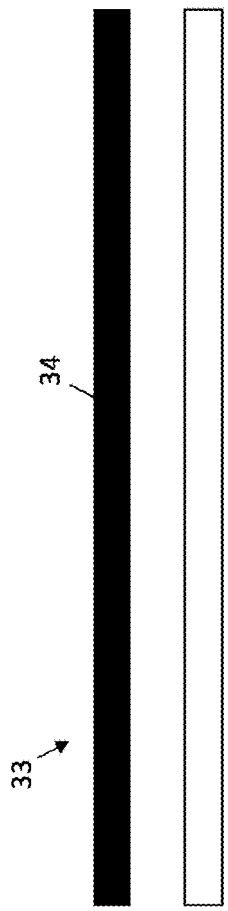
Fig. 6A
Fig. 6B

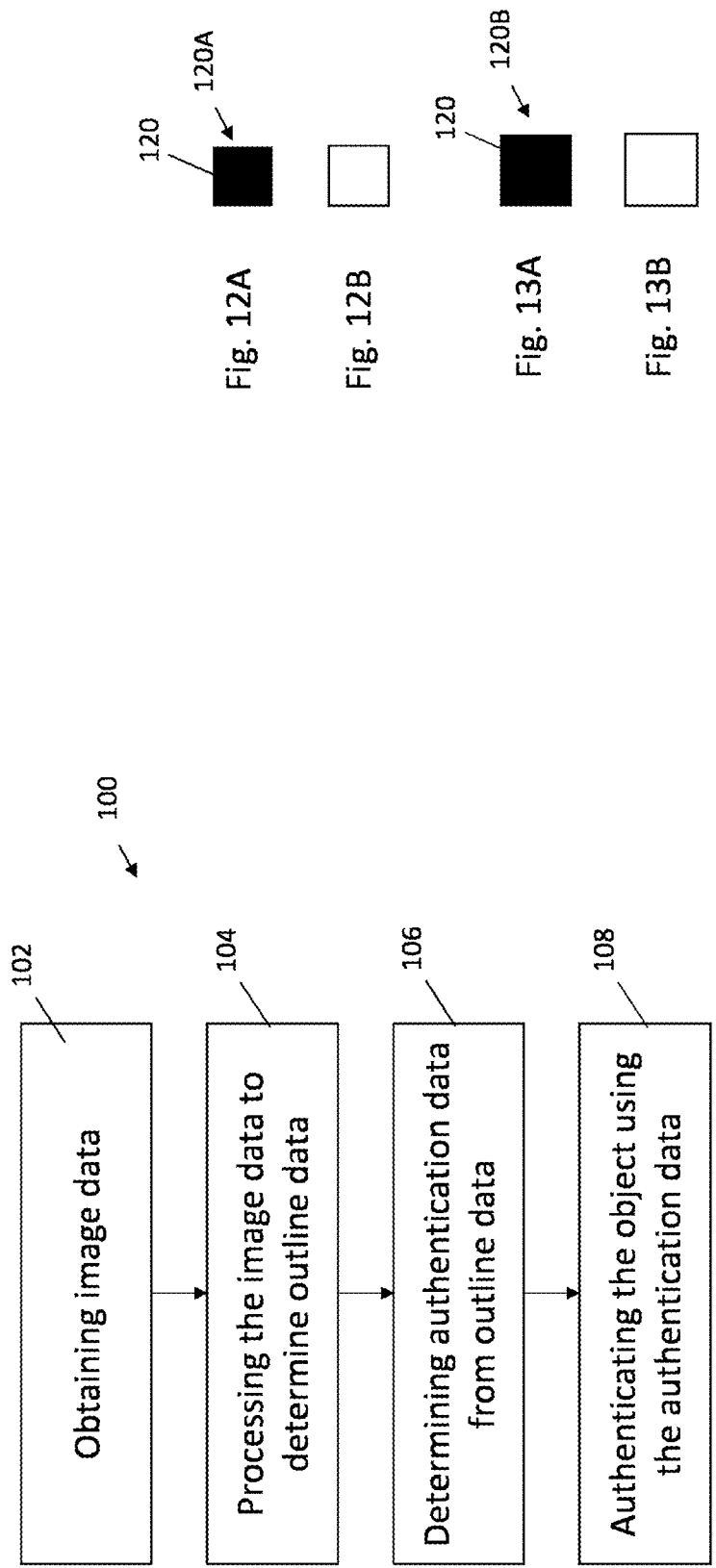

DATA PROCESSING APPARATUS

FIELD OF INVENTION

The present invention relates to an apparatus, method, computer readable medium and computer program for: determining authentication data for authenticating an object; for generating or updating an authentication data store; for authenticating an object.

BACKGROUND OF THE INVENTION

WO2005/080088 describes a method of verifying whether an object is genuine. An object with embedded fibres is provided, the embedded fibres emitting visible electromagnetic radiation when illuminated with ultraviolet electromagnetic radiation. The fibres are randomly distributed so that the object can be identified from the relative positions of the fibres. In order to verify that the object is genuine, the object is illuminated with ultraviolet radiation and an image of the object is taken by a camera. The image is then converted into a numerical code which is compared to corresponding numerical codes stored in a database. If the code matches one of the codes in the database, it can be determined that the object is genuine. However, in order for this method to yield reproducible results, the image capture conditions under which the image of the object is captured should be tightly controlled, otherwise discrepancies between images can be too great for codes generated from them to be accurately compared. For example, for both the determination of the code to be stored in the database and the (typically later) determination of the code for comparison to the codes stored in the database, the object should be provided at a specific distance from the camera, at a specific angle relative thereto. In addition, the camera equipment should be of the same specification and the ambient lighting conditions under which the images are captured should be similar. This tight control of the conditions under which the image is captured is not always easily achievable in practice, and can increase the costs of implementing this type of object authentication system.

Thus, improvements to the method of WO2005/080088 are desirable.

SUMMARY OF INVENTION

A first aspect of the invention provides data processing apparatus. Typically the data processing apparatus comprises one or more processors. Typically the data processing apparatus is to perform a method of determining authentication data for authenticating an object comprising one or more identification elements which are detectable (e.g. which are optically visible) when electromagnetic radiation is incident thereon. Typically the method comprises obtaining image data relating to one or more of the said identification element(s) of the object. Typically the method further comprises processing the image data to determine outline data relating to outline(s) of one or more of the identification element(s) to which the said image data relates. Typically the method comprises determining the authentication data from the outline data.

A second aspect of the invention provides a method of determining authentication data for authenticating an object comprising one or more identification elements which are detectable (e.g. which are optically visible) when electromagnetic radiation is incident thereon. Typically the method comprises obtaining image data relating to one or more of the said identification element(s) of the object. Typically the method comprises processing the image data to determine outline data relating to outline(s) of one or more of the said identification element(s) to which the said image data relates. Typically the method comprises determining the authentication data from the outline data.

By determining the authentication data from the outline data rather than directly from the image data, authentication data can be determined more consistently and reproducibly, even when it is determined from image data captured under different lighting conditions or with different types or specifications of image capture equipment, and even when it is determined from image data captured from different angles or from different distances from the object. This improves the authentication system as a whole, making it both more reliable and easier to implement at least because stringent controls are not required over the image capture equipment used, the relative arrangement between the image capture equipment and the object or the ambient conditions under which the image data is captured.

It may be that the image data relates to an image of at least a portion of the object comprising the one or more identification elements to which the image data relates.

It may be that the image data relating to one or more identification elements of the object comprises image data derived from or representing an image of at least a portion of the object comprising at least respective portion(s) of the one or more identification elements to which the image data relates.

It may be that the outline data relating to outline(s) of one or more of the identification element(s) to which the said image data relates comprises outline data derived from or representing outline(s) of at least respective portion(s) of one or more of the identification element(s) to which the said image data relates.

It may be that processing the image data to determine the outline data comprises applying a thresholding algorithm to the image data, typically to thereby trace around the outer edge(s) of at least respective portion(s) of one or more of the identification element(s) to which the image data relates. Typically the outline data relates to trace(s) around the outer edge(s) of at least respective portion(s) of one or more of the identification element(s) to which the image data relates. It may be that the outline data represents trace(s) around the outer edge(s) of at least respective portion(s) of one or more of the identification element(s) to which the image data relates.

It may be that the identification element(s) of the object are detectable when visible, ultraviolet, infrared, gamma ray, X-ray or microwave electromagnetic radiation is incident thereon.

It may be that the image data further comprises image data relating to a background of the object on which the identification element(s) to which the outline data relates are provided, the said identification element(s) being (e.g. optically) distinguishable from the background when electromagnetic radiation is incident on the said background and on the said identification element(s).

It may be that the object comprises a substrate comprising the identification element(s). It may be that the image data relating to the background comprises image data relating to (e.g. representing) the substrate comprising the identification elements. It may be that the substrate provides the background on which the identification elements are provided.

It may be that the image data further comprises image data relating to a or the substrate of the object comprising the identification element(s) to which the outline data relates, the said identification element(s) being (e.g. optically) distinguishable from the substrate when electromagnetic radiation is incident on the said substrate and on the said identification element(s).

It may be that the identification element(s) to which the outline data relates are distinguishable from the background or substrate when electromagnetic radiation is incident on the said background or substrate and on the said identification element(s) by the said identification element(s) interacting differently with or responding differently to the said incident electromagnetic radiation from the said background or substrate.

It may be that the identification element(s) to which the outline data relates are detectable when electromagnetic radiation is incident thereon by being (e.g. optically) distinguishable from the background or substrate when electromagnetic radiation is incident on the said background or substrate and on the said identification element(s).

It may be that the image data is two-dimensional image data. It may be that the outline data relates to two-dimensional outline(s) of one or more of the identification element(s) to which the image data relates. It may be that the outline data represents two-dimensional outline(s) of at least respective portion(s) of one or more of the identification element(s) to which the image data relates.

It may be that the said one or more processors are computer processor(s). It may be that the said one or more processors are hardware processor(s). It may be that the said one or more processors are general purpose or special purpose processor(s). It may be that the said one or more processors comprise a plurality of processors provided by the same machine or distributed across more than one machine.

It may be that the one or more processors are configured to perform the method. It may be that the data processing apparatus comprises a memory storing instructions executable by the one or more processors to perform the method.

It may be that the method comprises determining the authentication data from the outline data by performing one or more measurements on the outline data.

It may be that the said outline(s) to which the outline data relates have position(s) based on the position(s) of the corresponding identification element(s) to which the said image data relates.

It may be that the said outline(s) to which the outline data relates have a spatial distribution based on a spatial distribution of the corresponding identification element(s) to which the said image data relates.

It may be that the method comprises determining the authentication data based on the position(s) of the outline(s) to which the outline data relates.

It may be that the object comprises a plurality of identification elements. It may be that the image data relates to a plurality of the said identification elements of the object. It may be that the outline data relates to outlines of a plurality of the said identification elements to which the image data relates.

It may be that the said outlines to which the outline data relates have relative positions based on the relative positions of the corresponding identification elements to which the said image data relates. It may be that the method comprises determining the authentication data based on the relative positions of the outlines to which the outline data relates.

It may be that the method comprises determining the authentication data from the outline data based on a or the spatial distribution of the outline(s) to which the said outline data relates.

It may be that the method comprises determining the authentication data from the outline data by measuring a spatial distribution of the outline(s) to which the outline data relates.

It may be that the outline data comprises a plurality of pixels relating to (e.g. representing at least portion(s) of) the said outline(s) of the said one or more of the identification element(s) to which the image data relates. It may be that the method comprises determining the authentication data based on a spatial distribution of the said pixels. It may be that the authentication data is a measure of a spatial distribution of the said pixels.

It may be that the method comprises determining the authentication data from the outline data by measuring a spatial distribution of the pixels of the outline data relating to (e.g. representing at least portion(s) of) the said outline(s) of the said one or more of the identification element(s) to which the image data relates.

It may be that the authentication data relates to a spatial distribution of the identification element(s) to which the outline data relates.

Typically the object comprises a plurality of distributed identification elements.

It may be that the object comprises a plurality of randomly distributed identification elements.

It may be that the object is an object from a group of objects comprising a plurality of objects. It may be that each object from the said group of objects has a plurality of identification elements which are detectable (e.g. which are optically visible) when electromagnetic radiation is incident thereon. It may be that the identification element(s) of each object from the said group of objects has a unique spatial distribution relative to the other objects of the said group of objects. Thus, it may be that the authentication data uniquely identifies the object from the other objects of the said group of objects. In this case, not only does the authentication data allow the object to be authenticated, it also allows the object to be distinguished from the other objects of the group. It will be understood that any of the features described herein relating to the identification elements of the object may also apply to the identification elements of the other object(s) of the said group where appropriate.

It may be that the authentication data comprises a numerical or alphanumerical code.

It may be that the method comprises dividing the outline data into a plurality of sub-regions. It may be that the method comprises counting the number of outline pixels (e.g. pixels of the outline data relating to or representing the at least portion(s) of the outline(s) to which the outline data relates) in each sub-region to determine the authentication data (typically comprising a numerical or alphanumerical code) from the outline data.

Authentication data (typically comprising a numerical or alphanumeric code) derived from a unique spatial distribution of identification elements of an object cannot be readily reverse engineered, thus making the object very difficult to counterfeit.

It may be that one or more or each of the identification element(s) to which the outline data relates are elongate. It may be that the detectable portions of one or more of the identification element(s), or the portions of one or more of the identification element(s) captured in the image data, are elongate. Although it is not necessary for the identification element(s) to which the outline data relates to be elongate in order to obtain the benefits of improved consistency and reproducibility of the authentication data provided by determining the authentication data from the outline data rather than directly from the image data, the said benefits are even more pronounced when the identification element(s) are elongate. The more elongate the identification element(s), the more pronounced the benefits.

It may be that the object comprises a label comprising one or more of the identification element(s) to which the outline data relates. Preferably the label is integrally formed with the object, but it may be that the label is attached to or printed, affixed to or etched on the object.

It may be that the identification element(s) to which the outline data relates are embedded identification elements. It may be that the identification element(s) are embedded in the object, such as embedded in the label of the said object. By embedding the identification element(s) in the said object, the object becomes more difficult to counterfeit.

It may be that the identification element(s) to which the outline data relates are printed on or affixed to or etched on the object or provided in a coating applied to the object.

It may be that the identification element(s) to which the outline data relates are detectable by way of electromagnetic radiation when electromagnetic radiation is incident thereon. It may be that the identification element(s) to which the outline data relates are detectable by way of its/their interaction with or response to electromagnetic radiation incident thereon. For example, it may be that the one or more identification element(s) to which the outline data relates are detectable by reflecting, absorbing, transmitting or absorbing and re-emitting incident electromagnetic radiation. It may be that the one or more identification element(s) to which the outline data relates are detectable by reflecting, absorbing, transmitting or absorbing and re-emitting incident visible, ultraviolet, infrared, gamma ray, X-ray or microwave electromagnetic radiation. It may be that the one or more identification elements to which the outline data relates comprise one or more reflective, electromagnetic radiation absorbent, transparent or luminescent (e.g. fluorescent) identification elements. It may be that the identification element(s) are detectable (e.g. optically visible) by reflecting (e.g. visible) electromagnetic radiation incident thereon. It may be that the identification element(s) are more or less reflective of the said incident electromagnetic radiation than a or the background of the object on which the identification element(s) are provided or than a or the substrate comprising the identification element(s). It may be that the identification element(s) are detectable (e.g. optically visible) by absorbing (e.g. visible) electromagnetic radiation incident thereon. It may be that the identification element(s) are more or less absorptive of the said incident electromagnetic radiation than a or the background of the object on which the identification element(s) are provided or than a or the substrate comprising the identification element(s). It may be that the identification elements are detectable (e.g. optically visible) by emitting (e.g. visible) electromagnetic radiation responsive to (e.g. ultraviolet) electromagnetic radiation incident thereon, such as by absorbing (e.g. ultraviolet) electromagnetic radiation incident thereon and re-emitting (e.g. visible) electromagnetic radiation. It may be that the identification element(s) absorb and re-emit electromagnetic radiation to a greater or lesser extent than a or the background of the object on which they are provided or than a or the substrate comprising the identification element(s). It may be that the identification element(s) are more or less luminescent (e.g. fluorescent) in response to said incident electromagnetic radiation than a or the background of the object on which they are provided or than a or the substrate comprising the identification element(s). It may be that the identification element(s) are detectable (e.g. optically visible) by transmitting (e.g. visible) electromagnetic radiation incident thereon. It may be that the identification element(s) are more or less transparent to the said incident electromagnetic radiation than a or the background of the object on which the identification element(s) are provided or than a or the substrate comprising the identification element(s).

It may be that the identification elements of the object are visually indistinguishable from a or the background of the object on which they are provided or from a or the substrate comprising the identification element(s) (or visually indistinguishable from the rest of the object) when illuminated only with visible electromagnetic radiation (e.g. of wavelength in the range 380 nm to 700 nm). In this case, the identification elements are typically distinguishable from the background or substrate when electromagnetic radiation of a non-visible wavelength is incident thereon. Alternatively, it may be that the identification elements of the object are visible, and typically optically distinguishable over the background or substrate, when visible electromagnetic radiation is incident thereon.

It may be that the identification element(s) to which the outline data relates are optically detectable (e.g. by way of visible electromagnetic radiation) when electromagnetic radiation is incident thereon.

It may be that the one or more identification element(s) to which the outline data relates are optically detectable (e.g. optically visible) by reflecting, transmitting or absorbing visible incident electromagnetic radiation (i.e. visible to humans) or by absorbing incident electromagnetic radiation and (e.g. fluorescently) re-emitting visible electromagnetic radiation.

It may be that the one or more identification element(s) to which the outline data relates are optically detectable (e.g. optically visible) by reflecting, transmitting or absorbing incident electromagnetic radiation having a wavelength in the range 380 nm to 700 nm or by absorbing incident electromagnetic radiation and (e.g. fluorescently) re-emitting electromagnetic radiation having a wavelength in the range 380 nm to 700 nm.

It may be that the one or more identification elements to which the outline data relates comprise one or more particles, flakes, foils, threads or fibres. It may be that the one or more identification elements to which the outline data relates comprise one or more metal shards.

Typically the identification elements to which the outline data relates comprise fibres. Optionally, the fibres are selected from the group consisting of viscose rayon fibres, polyamide (nylon) fibres, polyester fibres, wool fibres, cellulose fibres, synthetic fibres, glass fibres, ceramic fibres, paper fibres and water-resistant paper fibres. It may be that the identification elements are viscose rayon fibres.

Alternatively, the identification elements may be solid particulates. For example, the identification elements may be selected from the group consisting of mica, silica and synthetic particulates.

Typically, the identification element(s) to which the outline data relates are fluorescent so that they emit visible light in response to ultraviolet light. Typically, the identification element(s) to which the outline data relates are provided with a fluorescent coating (e. g. by being dyed with a fluorescent dye such as salicyladazine or napthaldazine which are particularly appropriate fluorescent dyes for viscose rayon fibres) or the identification element(s) to which the outline data relates may be naturally fluorescent (e.g. the identification element(s) may comprise the mineral fluorite or the range of lanthanides, such as terbium and dysprosium). Alternatively, the identification element(s) to which the outline data relates may be visible (e.g. by reflection, transmission or absorption or absorption and re-emission of electromagnetic radiation incident thereon) when light of visible or infrared wavelengths is incident thereon. Thus it may be that the identification elements are optically detectable when ultraviolet, visible or infrared electromagnetic radiation is incident thereon.

By the identification element(s) being detectable by way of (e.g. reflecting, transmitting, absorbing or emitting) visible electromagnetic radiation when electromagnetic radiation is incident thereon, low cost cameras capturing image data using wavelengths of electromagnetic radiation in the visible range (380 nm-700 nm) may be used in order to capture the image data.

It may be that the method includes causing electromagnetic radiation, such as visible, ultraviolet, infrared, gamma ray, X-ray or microwave electromagnetic radiation, to be incident on the identification element(s) to which the outline data relates such that they are detectable.

It may be that the method comprises causing electromagnetic radiation to be detected by image capture equipment (e.g. a camera) to thereby capture an image relating to one or more identification element(s) of the object. It may be that the image data represents or is derived from the image captured by the image capture equipment (e.g. camera).

It may be that the object comprises a reference marker. It may be that the image data and/or the outline data relates to one or more identification elements provided at a portion of the object identified with reference to the reference marker.

It may be that the reference marker is in the form of a printed symbol. Preferably, the reference marker does not have rotational symmetry, so that the orientation of the object can be determined from the orientation of the reference marker. Thus, it may be that the reference marker is not rotationally symmetric. Preferably, the reference marker is in a T-shape.

It may be that the outline(s) to which the outline data relates comprise single pixel outline(s). It will be understood that a said single pixel outline typically consists of a single pixel wide arrangement of a plurality of pixels outlining a respective identification element.

It may be that the method further comprises causing electromagnetic radiation to be incident on the one or more identification elements to which the outline data relates such that the one or more identification elements are detectable.

It may be that the data processing apparatus is provided by a device comprising an electromagnetic radiation source for emitting electromagnetic radiation, the identification elements being detectable when the electromagnetic radiation emitted by the electromagnetic radiation source is incident thereon. It may be that the electromagnetic radiation source is a source of visible electromagnetic radiation. Alternatively the electromagnetic radiation source may be a source of ultraviolet, gamma ray, X-ray or microwave or infrared electromagnetic radiation.

It may be that the device further comprises image capture equipment for capturing an image of the identification elements to which the image data relates. The image data may represent or be derived from the said captured image. Alternatively, it may be that the device is configured to receive the image data, for example, from image capture equipment external to the device.

It may be that the device is handheld.

It may be that the object can be authenticated by a spatial distribution of one or more identification elements of a portion of the object. It may be that the image data relates to the said one or more identification elements of the said portion of the object. It may be that the said portion of the object can be determined from the location (and typically the orientation) of a or the reference marker (e.g. a reference symbol) of the object. It may be that the device is adapted to detect the location (and typically an orientation) of a or the reference marker (e.g. a or the reference symbol) of the object, and to provide image data relating to the said portion of the object in dependence thereon. Typically the said portion comprises one or more identification elements of the object. Typically the said one or more identification elements of the said portion of the object have a unique spatial distribution by which the object can be authenticated.

It may be that the image data is greyscale image data. Alternatively it may be that the data processing apparatus is configured to convert obtained image data into greyscale image data, for example prior to processing the image data to determine the outline data.

It may be that the object is a solid object. It may be that the object comprises paper, plastic, glass, metal or fabric comprising the identification elements. It may be that the object is an item of clothing, footwear, an electronic device, electrical appliance or a document such as a form of identification, such as a passport or driving licence, or a bank note, a cheque a debit, credit or store card or any secure documentation.

According to a third aspect of the invention, a method is provided of generating or updating an authentication data store comprising authentication data for authenticating an object comprising one or more identification elements which are detectable (e.g. optically visible) when electromagnetic radiation is incident thereon. It may be that the method of the third aspect comprises determining authentication data for authenticating an object by the method of the second aspect of the invention.

It may be that the method of the third aspect further comprises storing the authentication data in the authentication data store.

By generating or updating an authentication data store comprising the authentication data, a manufacturer of the object can keep a record of the authentication data applied to each object it manufactures. This record can then be used in the future to determine whether an object purporting to have been manufactured by the manufacturer is genuine, for example by comparing authentication data derived from the identification elements of the object to authentication data from the authentication data store.

It may be that the method of the third aspect further comprises obtaining further image data relating to one or more identification elements of a further object which are detectable (e.g. optically visible) when electromagnetic radiation is incident thereon. It may be that the method of the third aspect further comprises processing the further image data to determine further outline data relating to outline(s) of one or more identification element(s) to which the said further image data relates. It may be that the method of the third aspect further comprises determining further authentication data for authenticating the further object from the further outline data. It may be that the method of the third aspect further comprises storing the further authentication data in the authentication data store. In this way, an authentication data store can be provided which stores authentication data relating to a group of objects.

As discussed above, it may be that the identification elements of each object of the said group of objects from which the authentication data is derived has a unique spatial distribution relative to the other objects of the said group of objects. Thus, it may be that the authentication data uniquely identifies the object from the other objects of the said group of objects.

Typically, the object is provided with a secondary identifier. It may be that the method of the third aspect includes recording information relating to the secondary identifier, typically in association with the respective authentication data of that object. Preferably, the secondary identifier is unique to the object, such that it uniquely identifies the object in a or the said group of objects.

A fourth aspect of the invention provides a method of authenticating an object comprising one or more identification elements which are detectable (e.g. optically visible) when electromagnetic radiation is incident thereon. It may be that the method comprises determining authentication data for authenticating the object by the method of the second aspect of the invention. It may be that the method of the fourth aspect of the invention comprises authenticating the object by way of the authentication data. For example, it may be that the method of the fourth aspect comprises authenticating the object by comparing the authentication data to predetermined authentication data from an authentication data store. It may be that the authentication data store is stored in a local memory or in a remote memory such as a memory of a remote server. In the latter case, it may be that the predetermined authentication data is obtained from the memory of the remote server by way of a wired or wireless communications network. In another example, it may be that the method of the fourth aspect comprises authenticating the object by: transmitting (e.g. by way of a wired or wireless communications network, e.g. to a remote server comprising the authentication data store) the authentication data for comparison with predetermined authentication data from an authentication data store; and receiving authentication result data relating to the authentication of the object, the authentication result data depending on a comparison between the transmitted authentication data and the predetermined authentication data from the authentication data store (e.g. performed by a device such as a remote server comprising the authentication data store). In this latter case, the authentication store may be stored at one or more centralised remote servers. This may be beneficial as a manufacturer may only need to store and update a centralised authentication data store, thereby avoiding providing copies of the data store which may present a security risk or versioning issues.

It may be that the method of the fourth aspect comprises providing an authentication output indicative of whether the object has been determined to be genuine. Typically the authentication output is based on the said authenticating of the object by way of the authentication data.

It may be that the authentication data comprises a numerical or alphanumerical code. It may be that comparing the authentication data to predetermined authentication data from an authentication data store comprises comparing the numerical or alphanumerical code with one or more corresponding numerical or alphanumerical codes from the authentication data store, such as to within a specified tolerance level. Different tolerance levels may be selected to specify different levels of security.

Typically, the object is provided with a or the secondary identifier, such as a serial number.

It may be that the method of the fourth aspect of the invention comprises identifying the secondary identifier of the object from the image data. It may be that the method of the fourth aspect of the invention comprises selectively comparing the authentication data to authentication data from the authentication data store associated with the said secondary identifier. This helps to perform authentication of the object more quickly and less computationally intensively.

A fifth aspect of the invention provides data processing apparatus comprising one or more processors, the data processing apparatus being configured to perform the method of the third aspect of the invention.

A sixth aspect of the invention provides data processing apparatus comprising one or more processors, the data processing apparatus being configured to perform the method of the fourth aspect of the invention.

As above, it may be that the said one or more processors are computer processor(s). It may be that the said one or more processors are hardware processor(s). It may be that the said one or more processors are general purpose or special purpose processor(s). It may be that the said one or more processors comprise a plurality of processors provided by the same machine or distributed across more than one machine.

It may be that the one or more processors are configured to perform the respective method. It may be that the respective data processing apparatus comprises a memory storing instructions executable by one or more processors to perform the respective method.

A seventh aspect of the invention provides a (typically non-transitory) computer readable medium comprising computer readable code which when executed on data processing apparatus causes the data processing apparatus to perform the method according to the third aspect of the invention.

An eighth aspect of the invention provides a (typically non-transitory) computer readable medium comprising computer readable code which when executed on data processing apparatus causes the data processing apparatus to perform the method according to the fourth aspect of the invention.

A ninth aspect of the invention provides a computer program product comprising instructions which, when the program is executed by a computer, cause the computer to perform the method according to the second aspect of the invention.

A tenth aspect of the invention provides a computer program product comprising instructions which, when the program is executed by a computer, cause the computer to perform the method according to the third aspect of the invention.

An eleventh aspect of the invention provides a computer program product comprising instructions which, when the program is executed by a computer, cause the computer to perform the method according to the fourth aspect of the invention.

A twelfth aspect of the invention provides a computer implemented method comprising the method of the second aspect of the invention implemented by a computer.

A thirteenth aspect of the invention provides a computer implemented method comprising the method of the third aspect of the invention implemented by a computer.

A fourteenth aspect of the invention provides a computer implemented method comprising the method of the fourth aspect of the invention implemented by a computer.

A fifteenth aspect of the invention provides a device, such as a handheld device, comprising the data processing apparatus according to any of the first, fifth or sixth aspects of the invention. It may be that the device comprises an or the electromagnetic radiation source for emitting electromagnetic radiation, the identification elements of the device being detectable (e.g. optically visible) when electromagnetic radiation emitted by the electromagnetic radiation source is incident thereon. It may be that the device comprises image capture equipment, such as a camera, for capturing the said image data relating to the identification elements when electromagnetic radiation is incident thereon.

The various aspects, embodiments, examples and alternatives set out in the preceding paragraphs, in the claims and/or in the following description and drawings may be provided independently or in any combination. Features described in connection with one embodiment are applicable to all embodiments unless such features are incompatible.

BRIEF DESCRIPTION OF THE DRAWINGS

Embodiments of the invention are further described hereinafter with reference to the accompanying drawings, in which:

FIG. 3 schematically illustrates a system for determining authorisation data from the label of the object of FIG. 1;

FIG. 4A illustrates the determination of a numerical code from image data relating to an image of a portion of the label of the object of FIG. 1;

FIG. 4B illustrates the determination of a numerical code from outline data determined from an image of a portion of the label of the object of FIG. 1;

FIGS. 5A-5B respectively illustrate an example image of an elongate identification element and its outline;

FIG. 6A schematically illustrates an example image of the identification element of FIG. 5A but taken from a closer distance compared to the image of FIG. 5A, while FIG. 6B illustrates the outline of the identification element from the image of FIG. 6A;

FIG. 7A shows an image of an identification element of the label of the object of FIG. 1, and FIG. 7B schematically illustrates an outline of the identification element of the image of FIG. 7A;

FIG. 11 illustrates a method of authenticating an object of the type shown in FIG. 1;

FIGS. 12A-12B respectively illustrate an example image of a square identification element and its outline; and FIG. 13A schematically illustrates an example image of the square identification element of FIG. 12A but taken from a closer distance compared to the image of FIG. 12A, while FIG. 13B illustrates the outline of the identification element from the image of FIG. 13A.

DETAILED DESCRIPTION

The present disclosure relates to data processing apparatus, a method, a computer implemented method, computer software and one or more computer readable media storing computer software for determining authentication data for authenticating an object. It may be that the authentication data is derived from image data relating to one or more identification elements of the object. It may be that the image data is obtained by causing electromagnetic radiation to be incident on the identification elements and (e.g. optically) detecting the identification elements. It may be that the image data is threshold processed to determine outline data relating to outline(s) of one or more of the said one or more identification elements of the image. It may be that the authentication data is determined from the outline data, preferably to provide authentication data which is more tolerant to differences in the conditions under which the image data is captured.

Figure 2:
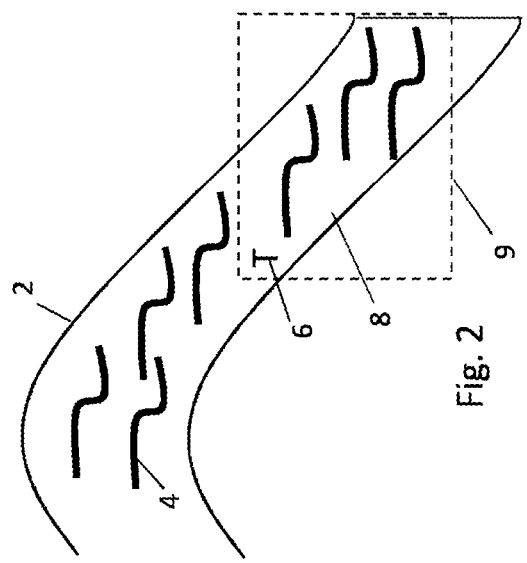
FIG. 2 is a close-up illustration of the label of the object of FIG. 1.
Figure 1:
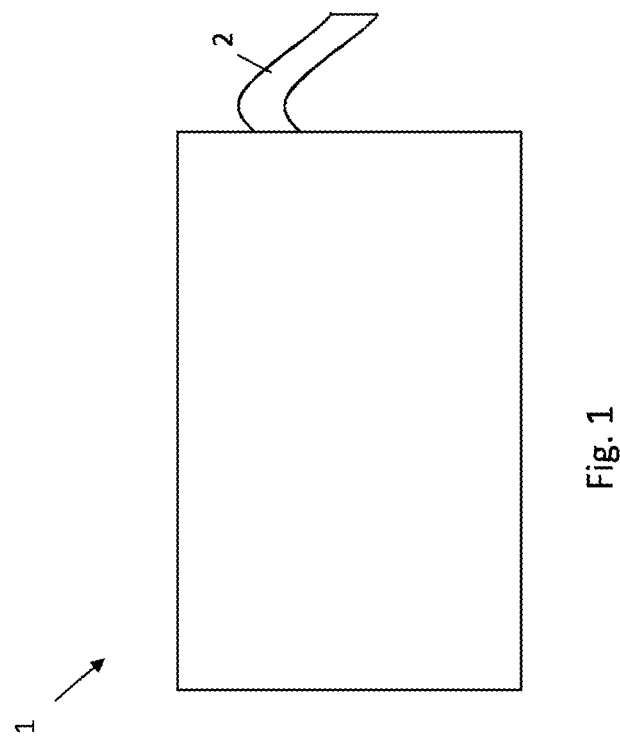
FIG. 1 schematically illustrates an object having a label comprising a plurality of identification elements.

FIG. 1 schematically shows an object 1, such as a product (such as an item of clothing such as a T-shirt, a shirt, a shoe or similar) or a document (such as a passport, a bank note, a credit or debit card, a certificate or similar) having a label 2. As shown in FIG. 2, which is a close-up view of the label 2 of FIG. 1, the label 2 comprises a substrate having a plurality of identification elements 4. Also shown in FIG. 2 is a reference symbol 6 printed on the label 2, which in this example is a T and thus lacks rotational symmetry. The reference symbol need not be a T but it is advantageous for the reference symbol to lack rotational symmetry at least because, if the reference symbol does not have rotational symmetry, the orientation of the reference symbol can be used to determine an orientation of the label 2 and thus the object 1.

The identification elements 4 may be provided on the label 2 as shown in FIG. 2 or elsewhere on the object 1. The object 1 may comprise, for example, paper, plastic, glass, metal or fabric comprising the identification elements 4. The identification elements 4 may be embedded in the object 1 (such as embedded in the label 2 of the object 1) or the identification elements 4 may be printed or otherwise affixed to or etched on the surface of the object 1 (such as printed or otherwise affixed to or etched on the surface of the label 2 of the object 1). The identification elements 4 may be embedded in a coating applied to the object 1 (e.g. during manufacture), such as embedded in a coating applied to the label 2 of the object 1. It may be that the coating is an adhesive coating.

It may be that the identification elements 4 comprise one or more metal shards, flakes, foils, threads or fibres. For example, the identification elements 4 may be selected from the group consisting of viscose rayon fibres, polyamide (nylon) fibres, polyester fibres, wool fibres, cellulose fibres, synthetic fibres, glass fibres, ceramic fibres, paper fibres and water-resistant paper fibres. It may be that the identification elements are viscose rayon fibres. Alternatively, the identification elements may be solid particulates. For example, the identification elements may be selected from the group consisting of mica, silica and synthetic particulates.

Ceramic fibres may be particularly useful in some applications as they are able to withstand high temperatures. For example, it may be that the identification element(s) 4 are embedded in a glass object. In this case, it may be that the process for embedding the identification element(s) 4 in the glass object comprises incorporating the identification element(s) 4 into molten glass before cooling the molten glass to form a solidified glass object comprising the embedded identification element(s). In this case, the identification element(s) 4 may comprise or consist of ceramic fibres. Ceramic fibres are particularly suited to this application as they are able to withstand the high temperatures of the molten glass. It will be understood that, alternatively, a glass object may be provided with identification element(s) 4 incorporated within a coating applied to the glass object, for example to solidified glass rather than to molten glass. In this case, the identification element(s) 4 do not need to withstand high temperatures and could comprise any suitable identification element(s) 4 such as cellulose fibre(s).

The identification elements 4 may be detectable (e.g. optically visible) when electromagnetic radiation is incident on them (e.g. by reflection, transmission, absorption or absorption and re-emission). For example, it may be that the identification elements 4 reflect visible electromagnetic radiation (e.g. electromagnetic radiation having a wavelength in the wavelength range 380 nm-700 nm) incident upon them so that they are optically detectable by way of the reflected visible electromagnetic radiation. It may be that the identification elements 4 are more reflective of visible electromagnetic radiation incident upon them than the substrate of the label 2 comprising the identification elements 4 so that they are optically distinguishable from the said substrate when visible electromagnetic radiation is incident thereon. That is, in this case, the substrate provides a background which is less reflective of visible electromagnetic radiation than the identification elements 4. In another example, it may be that the identification elements 4 absorb visible electromagnetic radiation (e.g. electromagnetic radiation having a wavelength in the wavelength range 380 nm-700 nm) incident upon them so that they are optically detectable by way of the absorbed visible electromagnetic radiation. It may be that the identification elements 4 are more absorptive of the incident visible electromagnetic radiation than the substrate of the label 2 comprising the identification elements 4 so that they are optically distinguishable from the substrate. That is, in this case, the substrate provides a background which is less absorptive of visible electromagnetic radiation than the identification elements 4. In other examples, it may be that the identification elements 4 are fluorescent (or otherwise luminescent) such that they emit visible electromagnetic radiation when electromagnetic radiation is incident upon them, such as ultraviolet or infrared electromagnetic radiation having wavelengths of less than 380 nm or greater than 700 nm respectively, so that they are optically detectable by way of the emitted visible electromagnetic radiation. For example, it may be that the identification elements 4 are more fluorescent than the substrate of the label 2 comprising the identification elements 4 so that they are optically distinguishable from the substrate. That is, in this case, the substrate provides a background which is less fluorescent of visible electromagnetic radiation in response to the incident electromagnetic radiation than the identification elements 4.

In the event that the identification elements are fluorescent, it may be that the identification elements 4 are provided with a fluorescent coating (e.g. the identification elements may be fluorescent by being dyed with a fluorescent dye such as salicyladazine or napthaldazine which are particularly appropriate fluorescent dyes for viscose rayon fibres) or they may be made from a material that is naturally fluorescent, such as the mineral fluorite or the range of lanthanides, such as terbium and dysprosium.

The identification elements 4 are preferably (but are not necessarily) elongate. It may be that the portions of one or more or each of the identification elements 4 which are detectable are elongate. For example, in the example of FIG. 2, the identification elements are elongate viscose rayon fibres. The identification elements may be 3 to 8 millimetres long or 4 to 8 millimetres long (e.g. 3 mm or 6 mm long). The identification elements may be less than 1.5 millimetres in diameter or less than 1 millimetre in diameter, for example 20 to 40 microns in diameter (e.g. 30 microns in diameter).

However, the identification elements may be of any suitable alternative dimensions. Although the example dimensions are expressed as length and diameter, whilst the identification elements 4 may be cylindrical, it will be understood that the identification element(s) do not need to be cylindrical, and that they may be any suitable shape. In the case where an identification element 4 is cylindrical, the diameter dimension may be understood as the length of a straight line passing through the centre, and between opposing sides, of a cross section of the identification element 4 taken perpendicular to its length. In the case where an identification element 4 is not cylindrical, the diameter dimension may be understood as the greatest extent between opposing sides of a cross section of the identification element 4 taken perpendicular to its length.

It may be that, for one or more or each of the identification element(s) 4, the ratio of the length of the identification element 4 to the diameter (or greatest extent between opposing sides) of a cross section of the identification element 4 taken perpendicular to its length is greater than 1, greater than 2, greater than 3, greater than 5 or greater than 10.

As shown in FIG. 2, the identification elements 4 may be spatially distributed across the label 2. Preferably the object 1 is an object from a group of similar objects each comprising a plurality of identification elements 4. In this case, it may be that the identification elements of each object in the group of objects are positioned differently and are thus uniquely spatially distributed across at least a portion of the object 1, for example uniquely spatially distributed across the label 2 of the object 1, so that each object 1 of the group of objects has a different spatial distribution of identification elements 4. For example, it may be that the spatial distribution of identification elements across the said at least a portion of the object is random for each object of the group. Thus, each object of the group can be identified by the spatial distribution of its identification elements.

The identification elements 4 may be, for example, spatially distributed across a surface of the object 1 or across a portion of a surface of the object 1, such as across the label 2 of the object 1 or a portion thereof. It may be that each object 1 of the group of objects can be identified from the positions, or spatial distribution, of all of the identification elements 4 of the object. It may be that each object 1 can be identified from the positions, or spatial distribution, of a subset of the identification elements 4 of the object 1. For example, it may be that a portion of the object 1, such as a portion 8 of the label 2 of the object 1 enclosed by the dashed box 9 of FIG. 2, is defined by reference to the reference symbol 6 (and typically with reference to the orientation of the reference symbol 6). In this case, it may be that the object 1 can be identified by the positions, or spatial distribution, of the identification elements 4 provided in the portion 8 of the object 1 defined by reference to the reference symbol 6 (and typically with reference to the orientation of the reference symbol 6). In the portion 8 of the object 1 shown in FIG. 2, there are three identification elements 4, and the object 1 can be identified by the positions, or spatial distribution, of the three identification elements 4.

A system 20 for authenticating the object 1 (i.e. for verifying that the object 1 is genuine) is illustrated in FIG. 3. The system 20 may comprise a device 22, which may be handheld. The device 22 may have an electromagnetic radiation source 24 for emitting electromagnetic radiation. The device 22 may have image capture equipment 25 such as a camera for capturing an image of the label 2 of the object 1 when electromagnetic radiation from the electromagnetic radiation source 24 is incident thereon. The device 22 may have one or more processors 26 such as one or more computer hardware microprocessors. The device 22 may have a memory 28 for storing image data relating to (e.g. image data representing) images captured by the image capture equipment 25 and for storing instructions executable by the one or more processors 26 to process the image data. It may be that any two or more (or all) of the electromagnetic radiation source 24, image capture equipment 25, processor(s) 26, memory 28 are provided in a common housing of the device 22. It may be that the device 22 is in communication with an authentication data store 30, such as wired or wireless communication, for example, by way of a wired or wireless communication network. Alternatively it may be that the authentication data store 30 is stored in local memory 28 or in another memory (not shown) of the device 22. Particularly in examples where the identification elements 4 are optically detectable by reflecting, transmitting or absorbing visible electromagnetic radiation, it may be that electromagnetic radiation source 24 is not required and that ambient light can instead be incident on the identification elements such that they are optically detectable.

In order to use the positions, or spatial distribution, of identification elements 4 of an object 1 to authenticate it, one approach is for a manufacturer to: obtain image data relating to an image of at least a portion of the object 1 comprising identification elements 4 (such as a portion of the object 1 comprising identification elements defined by reference to the position of the reference symbol 6 and its orientation); derive authentication data, such as a numerical or alphanumerical code, from a spatial distribution of pixels of the identification elements 4 of the object 1 provided in the said image data; and store the authentication data in authentication data store 30 (which may be a centralised authentication data store held by the manufacturer). For example, as illustrated in FIG. 4A, image data 35 relating to an image of a portion 8 of label 2 (see FIG. 2) defined with reference to the position of the reference symbol 6 (and typically with respect to its orientation) may be obtained and split into sub-regions. The image data may comprise a plurality of pixels representing the identification elements 4. As illustrated in FIG. 4A, the portion(s) of one or more or each of the identification elements 4 captured in the image data may be elongate. It may be that the portion(s) of one or more or each of the identification elements 4 captured in the image data have a ratio of length to width of greater than 1, greater than 2, greater than 3, greater than 5 or greater than 10. The number of identification element pixels in each of the sub-regions may be counted. In this case, it is assumed that the pixels of the image data 35 corresponding to the identification elements 4 are darker than the pixels of the image data 35 corresponding to the background of the label 2 on which the identification elements 4 are provided (e.g. the image data 35 may relate to a negative image). However, it will be understood that the pixels of the image data 35 corresponding to the identification elements 4 may be brighter than the pixels corresponding to the background of the label 2 on which the identification elements 4 are provided (e.g. the image data 35 may relate to a positive image).

In order to determine whether a pixel of the image data 35 is an identification element pixel or not, binary thresholding may be applied. For example, pixels having pixel values of less than a threshold may be considered to be identification element pixels, while pixels having pixel values of greater than the threshold may be considered to not be identification element pixels, or vice versa if the pixels of the image data 35 corresponding to the identification elements 4 are brighter than the pixels of the image data 35 corresponding to the background of the label 2 on which they are provided. Authentication data 37 may comprise or consist of the collection of identification element pixel counts for the sub-regions. In the example of FIG. 4A, the authentication data 37 may be: (220, 180, 0; 0, 500, 160; 0, 20, 120). The first set of three numbers of the authentication data relate to the respective numbers of identification element pixels in each of three sub-regions in a first, top, left-to-right row of sub-regions; the second set of three numbers relate to the respective numbers of identification element pixels in each of three sub-regions in a second left-to-right row of sub-regions immediately below the first row; and the third set of three numbers relate to the respective numbers of identification element pixels in each of three sub-regions in a third left-to-right row of sub-regions immediately below the second row. The authentication data 37 is stored in the authentication data store 30.

In order to later authenticate the object 1 (i.e. verify that it is genuine), it may be that authentication data is derived from the spatial distribution of the pixels of identification elements 4 from another image of the portion 8 of the object 1 defined by reference to the reference symbol 6 (typically also with reference to its orientation) in the same way for comparison with the authentication data stored in the authentication data store 30. If there is a match between the authentication data originally determined by the manufacturer and the authentication data determined later to verify that the object is genuine, it may be determined that the object 1 is genuine. If not, it may be determined that the object 1 is not genuine. It may be that an exact match between the codes is not necessary in order to verify that an object is genuine, but rather a match to within a predefined tolerance range may be sufficient. Different tolerance ranges may be defined to thereby define different security levels.

A problem with this approach is that the conditions under which the images from which the authentication data is derived are captured may not be consistent. For example, different cameras may be used, the distances and/or angles between the camera and the object 1 may be different, the lighting may be different, different electromagnetic radiation sources may be employed and so on. Such differences can cause the same identification elements 4 to appear thicker/thinner or longer/shorter in some images than in others, thus affecting the identification element pixel counts and reducing the accuracy with which the authentication data derived from the respective images can be compared. This increases the number of false positives and false negatives and/or limits the security level of the system (e.g. by limiting the tolerance range that can be applied). Accordingly, stringent controls may be imposed on the conditions under which the images are captured, which significantly increases the cost of implementing a system of this type.

To illustrate, FIG. 5A shows an image 31 of a rectangular identification element 34 and FIG. 6A shows another image 33 of the same rectangular identification element 34 taken from a slightly closer distance. As a result of the difference in distance between the camera and the identification element 34 in each case, the identification element 34 appears thicker and longer in image 33 than in image 31. The identification element 34 in image 33 comprises 2424 pixels, whereas the same identification element 34 in image 31 comprises 2000 pixels. This is a difference of 21.2% with respect to the number of pixels in image 31.

By first processing the image data from which the authentication data is derived to determine outline data relating to (e.g. data representing) outlines of the identification elements as illustrated in FIGS. 7A and 7B, and then deriving the authentication data from the outline data rather than directly from the image data, the differences in authentication data caused by capturing images of the identification elements under different conditions can be significantly reduced. This is because, by excluding internal pixels (i.e. within the outlines) of the identification elements which are present in the image data in the determination of the authentication data, the effect of the identification elements appearing thicker, thinner or longer or shorter in a subsequent image on the authentication data derived therefrom is reduced.

Extending the example of FIGS. 5A and 6A, FIG. 5B illustrates outline data relating to a single pixel outline of the identification element 34 from image 31 of FIG. 5A while FIG. 6B illustrates outline data relating to a single pixel outline of the identification element 34 derived from image 33 of FIG. 6A. The outline of identification element 34 in FIG. 6B is larger than the outline of the identification element 34 in FIG. 5B because the image of FIG. 6A was captured with the identification element 34 a shorter distance from the camera. The outline of FIG. 5B comprises 416 pixels, while the outline of FIG. 6B comprises 424 pixels. This is a difference of 1.9% with respect to the number of pixels in the outline of FIG. 5B. There is thus a significantly smaller relative difference between the numbers of pixels of the outlines of the identification element 34 of FIGS. 5B, 6B than between the numbers of pixels of the identification element 34 in the respective images 31, 33 of FIGS. 5A, 6A. Differences in the conditions under which images are captured can thus be better tolerated by determining the authentication data from the outline data rather than directly from the image data. This allows the numbers of false positives and false negatives to be reduced when authenticating objects. In addition, the security level of the system can be increased by specifying tighter tolerance ranges. Additionally or alternatively, inexpensive image capture equipment can be used to capture images from which the authentication data is derived, and less stringent controls need to be applied to the conditions under which the images are captured. In this way, the authentication system can be implemented more inexpensively without reducing (and even improving) its performance.

FIG. 4B illustrates outline data 40 derived from the image data of FIG. 4A. The relative positions of the outlines 41 in the outline data 40 correspond to the relative positions of the identification elements 4 in the image data 35 from which they are derived. The outlines 41 of the said identification elements 4 thus have relative positions, and a spatial distribution, based on the relative positions, and a spatial distribution, of the identification elements 4 of the image data 35. As illustrated by FIG. 4B, if portions of one or more of the identification elements 4 captured in the image data are elongate, the corresponding outline(s) 41 thereof are also elongate. Authentication data 44 may be derived from the outline data 40 and may relate to, and indeed may be a measure of, the positions, or spatial distribution of, the outlines 41 of the said outline data 40. The outlines 41 of the said identification elements 4 each comprise a plurality of pixels. The authentication data may be derived from the outline data 40 and may relate to, and indeed may be a measure of, the positions, or spatial distribution of, the pixels of the said outline data 40. Thus, the authentication data derived from the outline data 40 may be based on the positions, or spatial distribution, of the outlines 41 of the outline data 40. As the relative positions, and spatial distribution, of the outlines 41 of the outline data 40 are based on the relative positions, and spatial distribution, of the identification elements 4 from the image data 35, the authentication data derived from the outline data 40 may thus also relate to the relative positions, and spatial distribution, of the said one or more identification elements 4 in the image data 35.

In the example illustrated in FIG. 4B, authentication data 44 may be derived from the outline data 40 in a similar way to way in which authentication data is derived directly from the image data 35 as discussed above with reference to FIG. 4A. More specifically, the outline data 40 may be divided into sub-regions 42 and the numbers of outline pixels in each sub-region of the outline data 40 are counted. As before, in order to determine whether a pixel is an outline pixel or not, binary thresholding may be applied. For example, as above, pixels of the outline data 40 having pixel values of less than a threshold may be considered to be outline pixels, while pixels of the outline data 40 having pixel values of greater than the threshold may be considered to not be outline pixels, or vice versa if the pixels of the outline data 40 corresponding to the outlines of the identification elements 4 are brighter than the background pixels between them. Authentication data 44 derived from the outline data 40 may comprise or consist of the collection of outline pixel counts for the sub-regions 42. In the example of FIG. 4B, the authentication data 44 may be (55, 45, 0; 0, 125, 40; 0, 5, 30). The first set of three numbers of the authentication data 44 relate to the respective numbers of outline pixels in each of three sub-regions in a first, top, left-to-right row of sub-regions; the second set of three numbers relate to the respective numbers of outline pixels in each of three sub-regions in a second left-to-right row of sub-regions immediately below the first row; and the third set of three numbers relate to the respective numbers of outline pixels in each of three sub-regions in a third left-to-right row of sub-regions immediately below the second row. The authentication data 44 may then be stored in the authentication data store 30 as before in order to generate or update the authentication data store 30, or compared to corresponding authentication data stored in the authentication data store 30 in order to authenticate an object 1 as before.

Figure 8B:
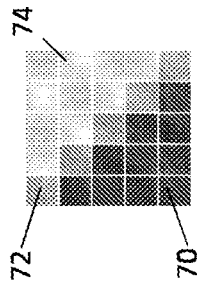
FIGS. 8A-8C illustrate a method for determining the outline of an identification element based on thresholding.
Figure 8C:
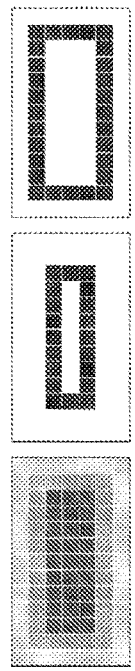
Figure 8A:
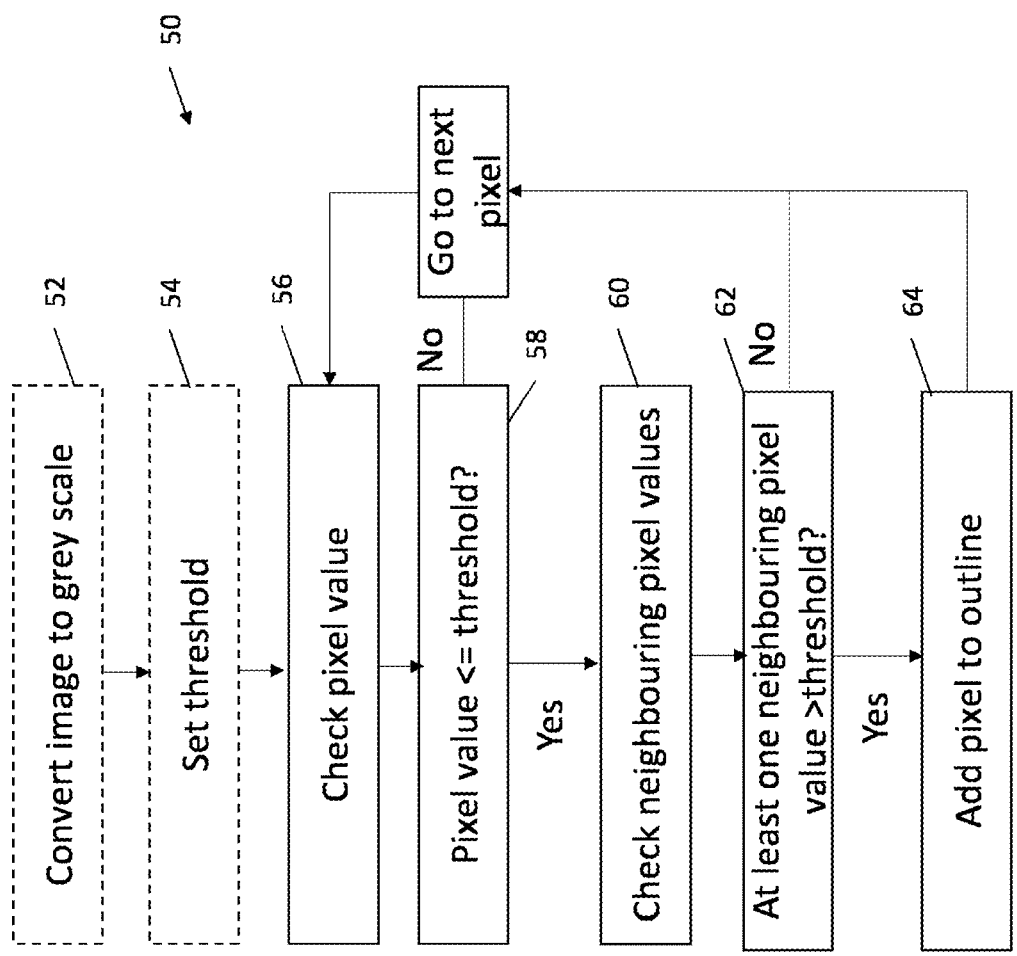

FIG. 8A illustrates a method 50 of determining outline data 40 relating to single pixel outlines of identification elements 4 from image data 35. The method may be based on a thresholding algorithm. Again, it is assumed here that the pixels of the image data 35 corresponding to the identification elements 4 are darker than the pixels of the image data 35 corresponding to the background of the label 2 on which they are provided, but the opposite may apply. The method 50 may comprise at 52 obtaining the image data and converting it to grey scale image data. The method may further comprise at 54 setting a threshold value. Both 52 and 54 are illustrated in dotted lines in FIG. 8A as they may be omitted. For example, the image data 35 may be captured in grey scale (and thus not need converting to grey scale) or the method 50 may be readily adapted for colour image processing, typically depending on the colours of the identification elements in the image data 35. In addition, the threshold value may be pre-set. In this case, a threshold of 100 may be applied, assuming the image data is grey scale byte image data in which each pixel value is stored as an 8-bit integer (where a value of 0 is black and 255 is white).

The method may further comprise at 56 checking the value of a pixel of the image data, such as the top left hand pixel of the image data. At decision point 58, if the pixel value is greater (or, for examples in which the pixels corresponding to the identification elements 4 are brighter than the pixels corresponding to the background of the object on which they are provided, less) than the threshold, the method progresses back to 56 and checks the value of the next pixel of the image data. For example the method may choose the next pixel based on a predetermined left to right and vertically top to bottom scan of the image data. If the pixel value is less than (or, for examples in which the pixels corresponding to the identification elements 4 are brighter than the pixels corresponding to the background of the object on which they are provided, greater than) or equal to the threshold, a check is performed on the values of the neighbouring pixels at 60. The neighbouring pixels may include pixels immediately adjacent to the current pixel above, below and to the left and to the right of the current pixel, where available depending on the location of the pixel in the image data. The neighbouring pixels may also include pixels immediately diagonally adjacent to the current pixel (i.e. top right, top left, bottom right, bottom left). At decision point 62, if at least one neighbouring pixel has a value greater (or, for examples in which the pixels corresponding to the identification elements 4 are brighter than the pixels corresponding to the background of the object on which they are provided, less) than the threshold, the method progresses to add the current pixel to the outline data at 64 and the method progresses to the next pixel and reverts to 56. If no neighbouring pixels have a value greater (or, for examples in which the pixels corresponding to the identification elements 4 are brighter than the pixels corresponding to the background of the object on which they are provided, less) than the threshold, the current pixel is not added to the outline data and the method progresses to the next pixel and reverts to 56. This can be repeated until all of the pixels of the image data are processed, resulting in traces being performed around the outer edges of the identification elements to provide the outline data. It will be understood that in some cases the image data may comprise one or more portions of one or more of the identification elements (rather than for example the full lengths of each of the identification elements). In this case, it may be that the outlines are of the respective portions of the identification elements.

As shown in FIGS. 8B-8C, 8-bit grey scale image data contains pixels having values between 0 and 255 and the threshold applied affects the size of the outline that will be derived from image data relating to an image of an identification element. For example, the image data of FIG. 8B comprises a portion of an image (the full image of which is shown in the left hand frame of FIG. 8C) having pixels 70 having values of 100, pixels 72 having values of 160 and pixels 74 having a value of 200. In this example, if the threshold is set to 100, the outline shown in the centre frame of FIG. 8C is obtained by the above method. On the other hand, if the threshold is set to 160, the outline shown in the right hand frame of FIG. 8C is provided. The appropriate threshold value may be selected depending on the specific implementation, e.g. depending on any one or more of: a type of substrate on which the identification elements 4 are provided; the image capture equipment used to capture the image data from which the authentication data is derived; the lighting conditions under which the image data from which the authentication data is derived is captured; the type of identification elements 4 provided.

Figures 9, 10:
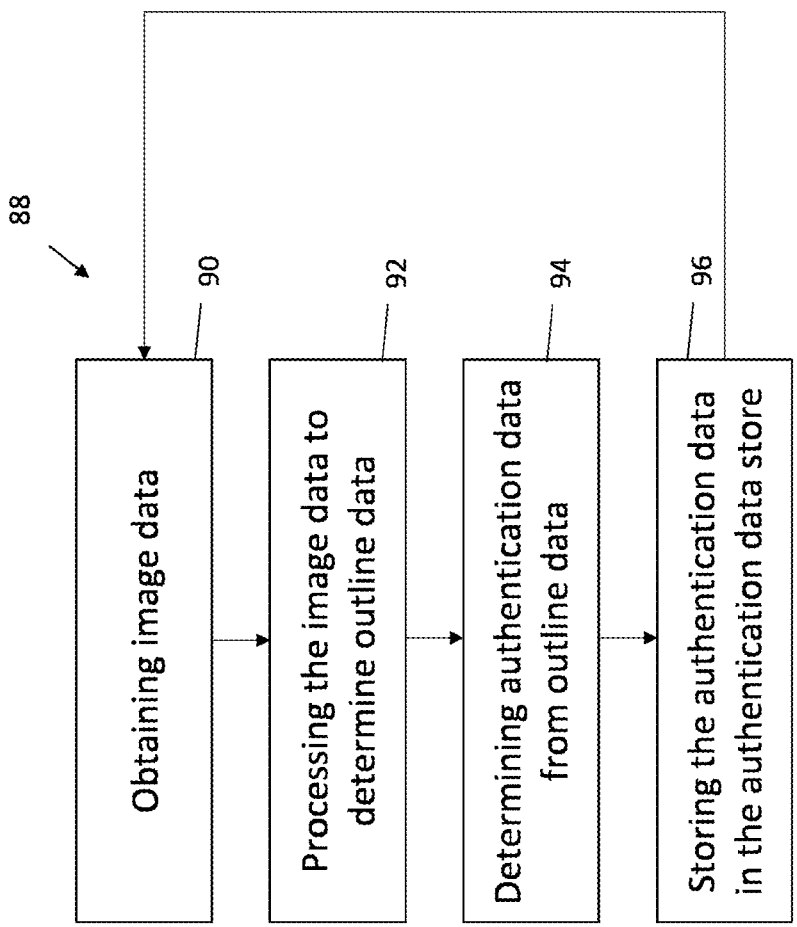
FIG. 9 illustrates a method of generating or updating an authentication data store storing authentication data for authenticating objects of the type shown in FIG. 1.
FIG. 10 illustrates a table relating to objects of the type shown in FIG. 1, the table associating serial numbers of the objects with numerical codes derived from the spatial distributions of identification elements on their labels or portions thereof.

FIG. 9 is a flow-chart of a method 88 for generating or updating an authentication data store 30, which may for example be applied by a manufacturer to each object 1 of a group of objects. Each object 1 may have at least a portion comprising one or more identification elements 4 having a unique spatial distribution with respect to the other objects of the group. The method 88 may for example be performed by one or more processors 26 of device 22, for example by executing computer program instructions stored in memory 28. At 90, the method may comprise obtaining image data 35 relating to an image of at least a portion of an object 1 (e.g. a label 2 or a portion of a label 2) comprising identification elements 4 (preferably image data relating to at least a portion of the object comprising a unique spatial distribution of identification elements with respect to the other objects of the group), such as by causing electromagnetic radiation from electromagnetic radiation source 24 of device 22 to be incident on at least a portion of the object 1 comprising identification elements 4 and causing an image of at least a portion of the object 1 comprising identification elements 4 (such as portion 8 defined with reference to reference symbol 6) to be captured by camera 25 of device 22. Typically the image data further comprises image data relating to a background of the object 1 on which the identification elements 4 are provided, the identification elements 4 being optically distinguishable from the background when electromagnetic radiation is incident on the said background and on the said identification elements 4. Alternatively, an image of at least a portion of the object comprising identification elements 4 (and typically a background of the object 1 on which the identification elements 4 are provided, and from which the identification elements 4 can be optically distinguished when electromagnetic radiation is incident on the said background and on the said identification elements 4) may be captured, and image data 35 relating to that image may be provided as an input to the method, by other means. At 92, the method may comprise processing the image data 35 to determine outline data 40 relating to outlines 41 of the identification elements 4 of the image (e.g. by the method of FIG. 8A). The outline data 40 may be stored, at least temporarily, in memory 28 of the device 22. Typically the outline data 40 comprises outlines of all of the identification elements present in the image data 35, but this is not necessarily the case. For example, the outline data may comprise outlines of a sub-set of the identification elements of the image data 35, such as a sub-set of identification elements provided at a portion of the object 1 defined by reference to the position of the reference symbol 6 (and typically its orientation).

At 94, the method may comprise determining authentication data 44 from the outline data 40, such as for example as described above with reference to FIG. 4B. At 96, the method may comprise storing the authentication data 44 in the authentication data store 30. The method may comprise storing the authentication data 44 in the authentication data store 30 in association with a secondary identifier of the object 1, such as a serial number 98. This is illustrated in FIG. 10 which provides a table comprising serial numbers 98 and associated authentication data. The serial number 98 may be printed on the object 1 such that, when the object 1 is later verified, the serial number 98 may be used to determine from the authentication store 30 the specific authentication data with which the authentication data 44 derived from the image data 35 should match. This allows a much quicker, less computationally intensive process to be performed in order to authenticate the object 1 since the authentication data 44 would only need to be compared to authentication data from the authentication data store relating to the serial number 98 (rather than, for example, with all of the authentication data in the authentication data store 30 in turn).

The method of FIG. 9 may be repeated for each object 1 of the group of objects.

FIG. 11 is a flow-chart illustrating a method 100 of authenticating an object 1 comprising identification elements 4. The method 100 may be performed by one or more processors 26 of the device 22, for example by executing computer program instructions stored in memory 28. 102-106 are identical to 90-94 described above and so their descriptions are not repeated here for brevity. After the authentication data 44 has been determined in 106, the object 1 may be authenticated using the authentication data in 108. Authenticating the object 1 may comprise comparing the authentication data 44 to authentication data from authentication data store 30. If the authentication data store 30 is locally stored on the device 22, it may be that this comparison is performed locally on the device 22. If the authentication data store 30 is remotely stored, for example on a remote server located remotely with respect to the device 22, it may be that the authentication data 44 is transmitted to the remote server and the comparison is performed on the remote server before the results of the comparison sent back to the device 22 by the remote server. Alternatively, the remote server may provide authentication data from the authentication data store 30 to the device 22 which may then perform the comparison locally. It may be that the comparison at 108 involves systematically comparing the authentication data derived from the outline data at 106 with authentication data from the authentication data store 30 until a match to within the required tolerance is found or until all of the authentication data in the authentication data store 30 has been tested. Alternatively, it may be that the method 100 further comprises obtaining a secondary identifier (e.g. a serial number 98) from the object 1 (e.g. by performing optical character recognition on an image of the serial number obtained from the object 1) and comparing the authentication data 44 with authentication data from the authentication data store 30 associated with that secondary identifier. As explained above, by using the secondary identifier in this way, the comparison at 108 is quicker and less computationally intensive.

It will be understood that, if there is a match to within a required tolerance range at 108 between the authentication data 44 determined from the outline data obtained at 106 and authentication data from the authentication data store 30, it may be determined that the object is genuine. If no such match is obtained, it may be determined that the object is not genuine. The method may further comprise providing an output (e.g. a visual or audio or audio-visual output) indicative of whether the object has been determined to be genuine or not—that is, the method may provide an output as to whether the object has been successfully authenticated.

While the benefits of using the outlines 41 of the identification elements 4 to determine the authentication data 44 apply to identification elements 4 of any shape, the benefits are more pronounced for elongate identification elements. The more elongate the identification elements, the more pronounced the benefits.

To illustrate that there are benefits to determining authentication data from outlines of non-elongate identification elements, FIG. 12A shows an image 120A of a square identification element 120.

FIG. 13A shows a second image 120B of the same square identification element 120 obtained by a camera at a reduced distance from the identification element 120. Due to the reduced distance from the camera, the identification element 120 looks taller and wider in image 120B. The number of pixels of the identification element 120 in image 120A is 2024, while the number of pixels of the identification element 120 in image 120B is 2208. This is a difference of 9.1% with respect to the number of pixels in image 120A.

FIG. 12B illustrates outline data relating to a single pixel outline of the identification element 120 derived from image 120A. This single pixel outline comprises 176 pixels. FIG. 13B illustrates outline data relating to a single pixel outline of the identification element 120 derived from image 120B. This single pixel outline comprises 184 pixels. This is a difference of 4.5% with respect to the number of pixels in the outline of FIG. 12B. Thus, it can be seen that differences in the conditions under which images are captured can thus be better tolerated by determining the authentication data from the outline data rather than directly from the image data even when the identification elements are not elongate.

It will be understood that, although the above embodiments relate to objects or portions of objects comprising a plurality of identification elements, the method of determining authentication data from outline data can also be applied to objects having a single identification element (e.g. a single identification element arranged differently for different objects so as to provide different authentication data for each object of a group of objects).

Although in the above embodiments the image data from which the outline data (and thus the authentication data) is derived relates to an image of a portion of the object 1 comprising a subset of the identification elements 4 of the object 1 (which has the benefit of reducing computational complexity), it will be understood that alternatively the image data from which the outline data (and thus the authentication data) is derived may relate to one or more images of the object comprising substantially all of the identification elements 4 of the object.

Although in the above embodiments the identification elements 4 are optically detectable by reflecting or absorbing visible electromagnetic radiation incident thereon or by absorbing incident ultraviolet or infrared electromagnetic radiation and re-emitting visible electromagnetic radiation, it will be understood that in other embodiments it may be that the identification elements 4 may be detectable by reflecting, transmitting or absorbing electromagnetic radiation of any detectable wavelength (e.g. ultraviolet, infrared, gamma ray, X-ray or microwave electromagnetic radiation) or by absorbing incident electromagnetic radiation of any suitable wavelength and re-emitting electromagnetic radiation of any detectable wavelength (e.g. ultraviolet, infrared, gamma ray, X-ray or microwave electromagnetic radiation). Accordingly, it will be understood that the electromagnetic radiation source 24 may be a source of electromagnetic radiation of any suitable wavelength (e.g. ultraviolet, visible, infrared, gamma ray, X-ray or microwave electromagnetic radiation) and that the image capture equipment 25 may be configured to detect electromagnetic radiation of any suitable wavelength (e.g. ultraviolet, visible, infrared, gamma ray, X-ray or microwave electromagnetic radiation) to thereby image the identification elements.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A data processing apparatus comprising one or more processors, the data processing apparatus being configured to perform a method of determining authentication data for authenticating an object comprising a plurality of randomly distributed identification elements which are detectable when electromagnetic radiation is incident thereon, the method comprising:
   obtaining image data relating to more than one of the identification elements of the object;
   processing the image data to determine outline data relating to outlines of more than one of the identification elements to which the image data relates; and
   determining the authentication data from the outline data, wherein the outline data comprises a plurality of pixels relating to the outlines of said more than one of the identification elements to which the image data relates, and wherein the authentication data is a measure of a spatial distribution of said pixels.

2. The data processing apparatus according to claim 1 wherein the more than one identification elements to which the outline data relates are elongate.

3. The data processing apparatus according to claim 1 wherein the object comprises a label comprising the more than one identification elements to which said outline data relates.

4. The data processing apparatus according to claim 1 wherein the more than one identification elements to which the outline data relates are embedded identification elements.

5. The data processing apparatus according to claim 1 wherein the more than one identification elements to which the outline data relates are printed on or affixed to or etched on the object or provided in a coating applied to the object.

6. The data processing apparatus according to claim 1 wherein the more than one identification elements to which the outline data relates comprise one or more reflective, transparent, electromagnetic radiation absorbent or luminescent identification elements.

7. The data processing apparatus according to claim 1 wherein the more than one identification elements to which the outline data relates comprise one or more particles, flakes, foils, threads or fibres.

8. The data processing apparatus according to claim 1 wherein the more than one identification elements to which the outline data relates are detectable by reflecting, transmitting, absorbing or absorbing and re-emitting incident electromagnetic radiation.

9. The data processing apparatus according to claim 1 wherein the more than one identification elements to which the outline data relates are optically detectable when electromagnetic radiation is incident thereon.

10. The data processing apparatus according to claim 1 wherein the more than one identification elements to which the outline data relates are optically detectable by reflecting, transmitting or absorbing incident electromagnetic radiation having a wavelength in the range 380 nm to 700 nm or by absorbing incident electromagnetic radiation and re-emitting electromagnetic radiation having a wavelength in the range 380 nm to 700 nm.

11. The data processing apparatus according to claim 1 wherein the object comprises a reference marker, and wherein the outline data relates to more than one identification elements provided at a portion of the object identified with reference to the reference marker.

12. The data processing apparatus according to claim 11 wherein the reference marker is not rotationally symmetric.

13. The data processing apparatus according to claim 1 wherein the outlines to which the outline data relates comprise single pixel outlines.

14. A device comprising the data processing apparatus according to claim 1.

15. A method of determining authentication data for authenticating an object comprising a plurality of randomly distributed identification elements which are detectable when electromagnetic radiation is incident thereon, the method comprising:
   obtaining image data relating to more than one of the identification elements of the object;
   processing the image data to determine outline data relating to outlines of the more than one of the identification elements to which the image data relates; and
   determining the authentication data from the outline data, wherein the outline data comprises a plurality of pixels relating to the outlines of said more than one of the identification elements to which the image data relates, and wherein the authentication data is a measure of a spatial distribution of said pixels.

16. The method of claim 15 further comprising causing electromagnetic radiation to be incident on the more than one of the identification elements to which the image data relates such that they are detectable.

17. A method of generating or updating an authentication data store comprising authentication data for authenticating an object comprising a plurality of randomly distributed identification elements which are detectable when electromagnetic radiation is incident thereon, the method comprising:
- determining authentication data for authenticating an object by the method of claim 15; and
- storing the authentication data in the authentication data store.

18. The method of claim 17 further comprising:
- obtaining further image data relating to one or more identification elements of a further object;
- processing the further image data to determine further outline data relating to outline(s) of one or more of the identification element(s) to which said further image data relates;
- determining further authentication data for authenticating the further object from the further outline data; and
- storing the further authentication data in the authentication data store.

19. A method of authenticating an object comprising a plurality of randomly distributed identification elements which are detectable when electromagnetic radiation is incident thereon, the method comprising:
- determining authentication data for authenticating the object by the method of claim 15; and
- authenticating the object by way of the authentication data.

20. The method of claim 19 comprising authenticating the object by comparing the authentication data to predetermined authentication data from an authentication data store.

21. The method of claim 19 comprising authenticating the object by:
- transmitting the authentication data for comparison with predetermined authentication data from an authentication data store; and
- receiving authentication result data relating to the authentication of the object, the authentication result data depending on a comparison between the transmitted authentication data and the predetermined authentication data from the authentication data store.

22. A data processing apparatus comprising one or more processors, the data processing apparatus being configured to perform a method of claim 15.

23. A non-transitory computer readable medium comprising computer readable code which when executed on data processing apparatus causes the data processing apparatus to perform the method according to claim 15.

24. A non-transitory computer program product comprising instructions which, when the program is executed by a computer, cause the computer to carry out the method of claim 15.

25. A computer implemented method comprising the method of claim 15 implemented by a computer.

* * * * *